United States Patent [19]

Kinkel et al.

[11] Patent Number: 5,668,216

[45] Date of Patent: Sep. 16, 1997

[54] CROSSLINKABEL DISPERSION POWDERS AS BINDERS FOR FIBERS

[75] Inventors: Johannes Kinkel, Emmerting, Germany; Gerhard Brink, Lyons, France; Walter Ernet; Joachim Schulze, both of Burghausen, Germany; Konrad Wierer, Mehring, Germany

[73] Assignee: Wacker-Chemie GmbH, Munich, Germany

[21] Appl. No.: 507,290

[22] PCT Filed: Mar. 3, 1994

[86] PCT No.: PCT/EP94/00625

§ 371 Date: Aug. 29, 1995

§ 102(e) Date: Aug. 29, 1995

[87] PCT Pub. No.: WO94/20661

PCT Pub. Date: Sep. 15, 1994

[30] Foreign Application Priority Data

Mar. 4, 1993 [DE] Germany .................. 43 06 808.1

[51] Int. Cl.$^6$ .............................. C08F 8/00; C08F 218/00
[52] U.S. Cl. ........................ 525/170; 526/307.7
[58] Field of Search ............................. 526/307.7

[56] References Cited

U.S. PATENT DOCUMENTS

| | | |
|---|---|---|
| 4,044,197 | 8/1977 | Wiest et al. . |
| 4,129,545 | 12/1978 | Sunamori et al. . |
| 4,322,516 | 3/1982 | Wiest et al. ............... 526/307.7 |
| 4,451,315 | 5/1984 | Miyazaki . |
| 4,528,315 | 7/1985 | Eck et al. . |
| 4,612,224 | 9/1986 | Davis . |
| 4,711,944 | 12/1987 | Sherwin et al. ............ 526/307.7 |
| 4,812,547 | 3/1989 | Mudge ..................... 526/307.7 |
| 4,847,309 | 7/1989 | Klesse et al. . |

FOREIGN PATENT DOCUMENTS

| | | | |
|---|---|---|---|
| 36659/89 | 7/1991 | Australia . | |
| 1094719 | 1/1981 | Canada . | |
| 2083651 | 6/1993 | Canada . | |
| 0170400 | 2/1986 | European Pat. Off. ............ 526/307.7 |
| 00801144 | 3/1986 | European Pat. Off. . | |
| 0304788 | 3/1989 | European Pat. Off. ............ 526/307.7 |
| 0545209 | 6/1993 | European Pat. Off. . | |
| 698193 | 10/1953 | United Kingdom ............... 526/307.7 |
| 842496 | 7/1960 | United Kingdom . | |
| 962109 | 6/1964 | United Kingdom ............... 526/307.7 |
| WO90/14457 | 11/1990 | WIPO . | |
| WO92/22603 | 12/1992 | WIPO . | |

*Primary Examiner*—Joseph L. Schofer
*Assistant Examiner*—N. Sarofim
*Attorney, Agent, or Firm*—Burgess, Ryan & Wayne

[57] ABSTRACT

This invention covers the use of cross-linkable redispersible dispersion powders based on vinyl ester copolymers or (meth)acrylic acid ester copolymers as binders for the dry binding of fibre materials.

6 Claims, No Drawings

CROSSLINKABEL DISPERSION POWDERS AS BINDERS FOR FIBERS

BACKGROUND OF THE INVENTION

1) Field of the Invention

The invention relates to the use of crosslinkable, redispersible dispersion powders based on vinyl ester copolymers or (meth)acrylic acid ester copolymers as binders for dry binding of fibre materials.

To increase resistance to mechanical stress, fibre structures are compacted with binders. These binders can be used in the form of solids, such as powders, granules or fibres, or as liquids, such as solutions or dispersions. The increased strength results from binding of the fibres by the polymers, which adhere to the fibre and in this way reinforce the fibre structures.

2) Background Art

A procedure is known from WO-A 90/14457 in which, after a carding step, glass fibres are mixed with a thermoplastic powder, for example polypropylene, polyester or polyamide, and the fibre structure is then compacted at elevated temperature and under pressure. AU-B 36659/89 also describes the compaction of glass fibre materials by means of thermoplastic powders. The use of polyesters or polystyrene is recommended here. A disadvantage is the low strength of the fibre structures thus bonded in contact with water or solvents.

If fibre non-wovens of increased strength, above all in contact with water or solvents or at elevated temperature, are to be obtained, polymers which can crosslink or polymerize completely in a particular processing step are employed. EP-B 0080144 (U.S. Pat. No. 4,451,315) describes the compaction of fibre non-wovens of polyester, polyamide or cotton fibres with emulsions of self-crosslinking acrylic ester copolymers, ethylene/vinyl acetate copolymers or self-crosslinking synthetic rubbers. Non-woven materials of high strength are indeed obtained by this process; the disadvantage of using aqueous binders, nevertheless, is the high drying expenditure; furthermore, distribution of the binder in the fibre matrix is problematic.

The compaction of pulverulent, crosslinkable polymers based on phenol-formaldehyde resins is described in U.S. Pat. No. 4,612,224. The disadvantage of this binder system is the high formaldehyde emission during preparation and use of the fibre materials thus compacted.

The invention was based on the object of providing binders for compaction of fibre materials which can be employed as powders and have a high wet strength and good heat stability, avoiding harmful emissions during processing.

The object has been achieved by the development of a dry binder based on thermoplastic copolymers which have only small contents of comonomers which have a crosslinking action and nevertheless effect a high strength coupled with a negligible formaldehyde emission.

Thermosetting copolymers based on acrylic acid esters and/or vinyl esters, which also comprise (meth)acrylic acid esters of mono- or polyfunctional hydroxycarboxylic acids and N-alkoxyalkyl(meth)acrylamide as crosslinking components, are described as pulverulent paints in DE-A 2701490 (U.S. Pat. No. 4,129,545).

SUMMARY OF THE INVENTION

The invention relates to the use of crosslinkable, redispersible dispersion powders based on vinyl ester copolymers or (meth)acrylic acid ester copolymers as binders for dry binding of fibre materials, wherein the vinyl ester copolymers comprise one or more monomers from the group comprising vinyl esters of unbranched or branched alkylcarboxylic acids having 1 to 15 C atoms, the (meth)acrylic acid ester copolymers comprise one or more monomers from the group comprising methacrylic acid esters and acrylic acid esters of alcohols having 1 to 10 C atoms and the vinyl ester and (meth)acrylic acid ester copolymers in each case comprise 0.1 to 10% by weight, based on the total weight of the copolymer, of one or more ethylenically unsaturated comonomers having a crosslinking action.

DESCRIPTION OF THE PREFERRED EMBODIMENTS

Preferred vinyl esters are vinyl acetate, vinyl propionate, vinyl butyrate, vinyl 2-ethylhexanoate, vinyl laurate, 1-methylvinyl acetate, vinyl pivalate and vinyl esters of branched monocarboxylic acids having 9 to 10 C atoms, for example VeoVa9® or VeoVa10®. Vinyl acetate is particularly preferred.

Preferred methacrylic acid esters or acrylic acid esters are methyl acrylate, methyl methacrylate, ethyl acrylate, ethyl methacrylate, propyl acrylate, propyl methacrylate, n-butyl acrylate, n-butyl methacrylate and 2-ethylhexol acrylate. Methyl acrylate, methyl methacrylate, n-butyl acrylate and 2-ethylhexyl acrylate are particularly preferred.

Preferred ethylenically unsaturated comonomers having a crosslinking action are, for example, acrylamidoglycolic acid (AGA), methacrylamidoglycolate acid methyl ester (MAGME), N-methylolacrylamide (NMAA), N-methylolmethacrylamide, allyl N-methylolcarbamate, alkyl ethers, such as isobutyl [sic] ether, or esters of N-methylolacrylamide, of N-methylolmethacrylamide or of allyl N-methylolcarbamate. N-methylolacrylamide (NMAA) and N-methylolmethacrylamide are particularly preferred.

If appropriate, the vinyl ester copolymers can comprise 1.0 to 65% by weight, based on the total weight of the comonomer phase, of α-olefins, such as ethylene or propylene, and/or vinyl aromatics, such as styrene, and/or vinyl halides, such as vinyl chloride, and/or acrylic acid esters or methacrylic acid esters of alcohols having 1 to 10 C atoms, such as methyl acrylate, methyl methacrylate, ethyl acrylate, ethyl methacrylate, propyl acrylate, propyl methacrylate, n-butyl acrylate, n-butyl methacrylate or 2-ethylhexyl acrylate, and/or ethylenically unsaturated dicarboxylic acid esters or derivatives thereof, such as diisopropyl fumarate, the dimethyl, dibutyl and diethyl esters of maleic acid or fumaric acid or maleic anhydride. The choice of the monomers mentioned is made here such that copolymers having a glass transition temperature $T_g$ of −20° C. to 60° C. are obtained.

If appropriate, the (meth)acrylic acid ester copolymers can comprise 1.0 to 65% by weight, based on the total weight of the comonomer phase, of α-olefins, such as ethylene or propylene, and/or vinyl aromatics, such as styrene, and/or vinyl halides, such as vinyl chloride, and/or ethylenically unsaturated dicarboxylic acid esters or derivatives thereof, such as diisopropyl fumarate, the dimethyl, dibutyl and diethyl esters of maleic acid or fumaric acid or maleic anhydride. The choice of the monomers mentioned is made here such that copolymers having a glass transition temperature $T_g$ of −20° C. to +60° C. are obtained.

In a preferred embodiment, the vinyl ester copolymers and the (meth)acrylic acid ester copolymers also comprise 0.05 to 3.0% by weight, based on the total weight of the comonomer mixture, of auxiliary monomers from the group comprising ethylenically unsaturated carboxylic acids, preferably acrylic acid or methacrylic acid, from the group comprising ethylenically unsaturated carboxylic acid amides, preferably acrylamide, from the group comprising ethylenically unsaturated sulphonic acids and salts thereof, preferably vinylsulphonic acid, and/or from the group comprising polyethylenically unsaturated comonomers, for example divinyl adipate, diallyl maleate, allyl methacrylate or triallyl cyanurate. Copolymers which comprise acrylamide in an equimolar amount to the particular crosslinking system are particularly preferred.

Preferred vinyl ester copolymers comprise:
- 70 to 95% by weight of vinyl ester, in particular vinyl acetate, as well as 5 to 25% by weight of α-olefin, in particular ethylene, and/or 5 to 30% by weight of diisopropyl fumarate and 0.1 to 10.0% by weight of N-methylol(meth)acrylamide, or
- 50 to 70% by weight of vinyl ester, in particular vinyl acetate, 10 to 30% by weight of vinyl ester of an α-branched carboxylic acid, in particular VeoVa9® and/or VeoVa10®, 5 to 25% by weight of ethylene and 0.1 to 10.0% by weight of N-methylol(meth) acrylamide, or
- 15 to 50% by weight of vinyl ester, in particular vinyl acetate, 30 to 65% by weight of vinyl chloride and/or diisopropyl fumarate, 5 to 25% by weight of ethylene and 0.1 to 10% by weight of N-methylol(meth) acrylamide, or
- 50 to 70% by weight of vinyl ester, in particular vinyl acetate, 1 to 30% by weight of acrylic acid ester, in particular n-butyl acrylate or 2-ethylhexyl acrylate, 5 to 25% by weight of ethylene and 0.1 to 10.0% by weight of N-methylol(meth)acrylamide. The data in % by weight in each case add up to 100% by weight.

Preferred (meth)acrylic acid ester copolymers comprises
- 30 to 70% by weight of methyl methacrylate, 70 to 30% by weight of n-butyl acrylate and/or 2-ethylhexyl acrylate and 0.1 to 10% by weight of N-methylol(meth) acrylamide, or
- 30 to 70% by weight of styrene and 70 to 30% by weight of n-butyl acrylate and/or 2-ethylhexyl acrylate and 0.1 to 10% by weight of N-methylol(meth)acrylamide. The data in % by weight in each case add up to 100% by weight.

The vinyl ester copolymers and the (meth)acrylic acid ester copolymers are preferably prepared by the emulsion polymerization process. The polymerization can be carried out discontinuously or continuously, with or without the use of seed latices, by initially introducing all of the constituents or individual constituents of the reaction mixture into the reaction vessel, or by initially introducing portions of the constituents or of individual constituents of the reaction mixture into the reaction vessel and subsequently metering in the remainder, or by the metering process without initial introduction of constituents. All the meterings are preferably carried out at the rate at which the particular component is consumed.

The polymerization is carried out in a temperature range from 0° to 100° C. and is initiated by the methods usually employed for emulsion polymerization. The initiation is carried out by means of the customary water-soluble agents which form free radicals, which are preferably employed in amounts of 0.01 to 3.0% by weight, based on the total weight of the monomers. Examples of these are ammonium and potassium persulphate and peroxodisulphate; hydrogen peroxide; alkyl hydroperoxides, such as tert-butyl hydroperoxide; potassium, sodium and ammonium peroxodiphosphate; and azo compounds, such as azobisisobutyronitrile or azobiscyanovaleric acid. If appropriate, the free radical initiators mentioned can also be combined in a known manner with 0.01 to 0.5% by weight, based on the total weight of the monomers, of reducing agents. Formaldehyde-sulphoxylate salts or ascorbic acid, for example, are suitable. In the case of redox initiation, one or both redox catalyst components are preferably metered in during the reaction.

Dispersing agents which can be employed are all the emulsifiers and protective colloids usually used during emulsion polymerization. 1 to 6% by weight, based on the total weight of monomers, of emulsifier is preferably employed. Suitable agents are, for example, anionic surfactants, such as alkyl sulphates having a chain length of 8 to 18 C atoms, alkyl and alkylaryl ether sulphates having 8 to 18 C atoms in the hydrophobic radical and up to 40 ethylene oxide or propylene oxide units, alkyl- or alkylarylsulphonates having 8 to 18 C atoms and esters and half-esters of sulphosuccinic acid with monohydric alcohols or alkylphenols. Suitable nonionic surfactants are, for example, alkyl polyglycol ethers or alkylaryl polyglycol ethers having 8 to 40 ethylene oxide units.

If appropriate, protective colloids can be employed, preferably in amounts of up to 15% by weight, based on the total weight of the monomers. Examples of these are vinyl alcohol/vinyl acetate copolymers containing 80 to 100 mol % of vinyl alcohol units, polyvinylpyrrolidones having a molecular weight of 5000 to 400,000 and hydroxyethylcelluloses having a degree of substitution range of 1.5 to 3.

The pH range desired for the polymerization, which is in general between 2.5 and 10, preferably 3 and 8, can be established in a known manner by acids, bases or customary buffer salts, such as alkali metal phosphates or alkali metal carbonates. To establish the molecular weight, the regulators usually used, for example mercaptans, aldehydes and chlorinated hydrocarbons, can be added during the polymerization.

To prepare the dispersion powders, the dispersion is dried, preferably spray-dried or freeze-dried, particularly preferably spray-dried. The known devices can be resorted to here, such as, for example, spraying through multi-component nozzles or using a disc, in a stream of dry gas which is heated if appropriate. In general, temperatures above 250° C. are not used. The optimum temperature of the dry gas can be determined in a few experiments; temperatures above 60° C. have often proved to be particularly suitable.

To increase storage stability and in order to prevent caking and blocking, for example in the case of powders of low glass transition temperature $T_g$, an antiblocking agent, for example aluminium silicates, kieselguhr or calcium carbonate, is added, if appropriate, during drying. Furthermore, defoamers, for example based on silicones or hydrocarbons, or atomization aids, for example polyvinyl alcohols or water-soluble melamineformaldehyde condensation products, can also be added to the dispersion if appropriate.

In a preferred embodiment, the dispersion powders also comprise 0 to 30% by weight, particularly preferably 1 to 15% by weight, based on the base polymer, of polyvinyl alcohol having a degree of hydrolysis of 85 to 94 mol %, and/or 0 to 10% by weight of vinyl alcohol copolymers having 5 to 35% by weight of 1-methylvinyl alcohol units, and/or 0 to 304 by weight, particularly preferably 4 to 20% by weight, based on the total weight of polymeric constituents, of antiblocking agent, and if appropriate up to 2% by weight, based on the base polymer, of defoamer.

The crosslinkable dispersion powder is suitable for compaction of naturally occurring or synthetic fibre materials. Examples of these are wood fibres, cellulose fibres, wool, cotton, mineral fibres, ceramic fibres, synthetic fibres based on fibre-forming polymers, such as viscose fibres, fibres of polyethylene, polypropylene, polyester, polyamide, polyacrylonitrile or carbon, fibres of homo- or copolymers of vinyl chloride or fibres of homo- or copolymers of tetrafluoroethylene.

Before the compaction, the fibres are spread out in a sheet-like manner. The processes for this are known and depend primarily on the use to which the compacted fibre material is put. The fibres can be laid out by means of an air laying, wet laying, direct spinning or carding device. If approcriate, the sheet-like structures can also be compacted mechanically, for example by cross-laying, needling or water jet compaction, before compaction with the binder.

In the use according to the invention, the pulverulent binder is sprinkled onto, sprinkled into (for example in the case of carded wadding) or shaken into the optionally mechanically precompacted fibre material or mixed directly with the fibre in a manner which is known per se. The amount of binder needed for compaction of the fibre material is between 5 and 50% by weight of binder, based on the fibre weight, depending on the field of use.

In a preferred embodiment, the sheet-like fibre structures are moistened with water before the binder is sprinkled on. The amount of water needed for this is, in general, 5 to 60% by weight, preferably 10 to 35% by weight, in each case based on the total weight of dry mixture of fibre and binder. In this procedure, binding of the fibre material can be initiated by application of pressure and temperature after the binder has been sprinkled on.

However, it is also possible for the water to be removed at a temperature of 80° to 110° C., for example by heating the fibre structure in a stream of air, after the binder has been sprinkled onto the moist fibre. In this case, before crosslinking of the binder, water must be sprayed onto the fibre again in the stated amount. Pre-binding of the fibre material is achieved by this procedure, which means that the fibre material can be transported in a pre-bound but not crosslinked form. This is an essential advantage over binding with dispersions, in which this pre-binding is not possible since it can no longer be reactivated.

For production of shaped articles from a mixture of fibre material and binder powder in the stated amounts, a procedure is preferably followed in which the fibre and binder are mixed in the dry state, and water is first added to the mixture in the stated amount before the pressure and heat treatment.

Compaction of the fibre material, whether as a sheet-like structure or as a fibre/binder mixture for production of shaped articles, is carried out by heating at a temperature of preferably 100° to 200° C. under a pressure of up to 100 bar. The pressure and temperature ranges to be applied depend primarily on the nature of the fibre material.

A preferred use is the production of mouldings from fibre materials which are compacted with the cross-linkable powder. For this, the fibres are mixed with the binder in the stated amounts and, after addition of water, the mixtures are compacted under the action of pressure and temperature in the stated ranges. Examples of this use are the production of soundproofing mats and mouldings for the car industry. Phenolic resins have hitherto been employed above all as binders for mouldings. The associated disadvantages of emission of formaldehyde and phenol do not occur with the use according to the invention.

Use for binding glass fibres is also preferred.

Another preferred use is that for binding wadding, for example for the production of upholstery, insulating and filter wadding. Fusible fibres, fusible powders and dispersions of vinyl chloride polymers, for the purpose of flameproofing, have primarily been employed for this purpose to date. Compared with the use of fusible fibres or fusible powders, the use according to the invention is distinguished by the fact that the desired strength can even be achieved with lower application amounts. Another advantage of the use according to the invention of crosslinkable dispersion powders is that admixing of pulverulent additives, for example flameproofing agents, pigments and salts, is not so severely limited in comparison with aqueous dispersions, both in respect of the nature of the additive and in respect of their physicochemical properties. The dispersion powders are miscible with pulverulent additives in any desired amount, without adding surfactants and without limiting the pot lives.

Similar advantages are offered by the similarly preferred use of the crosslinkable dispersion powders for the production of non-woven materials from fibres, in which polymer dispersions, fusible powders and fusible fibres likewise have been employed to date.

The use of the crosslinkable powders for the production of needle felt is also preferred. In the prior art, aqueous dispersions based on styrene/butadiene rubber, ethylene/vinyl acetate and ethylene/vinyl acetate/vinyl chloride copolymers are employed above all for this purpose. The dispersions are applied to the fibre fabric, which has been compacted by needling, and converted into a film in a hot calender. In the use according to the invention of the crosslinkable polymer powders, even taking into account the amount of water added for crosslinking, the drier capacity to be expended, and therefore the energy requirement needed for production, are reduced considerably.

Summarizing, the advantage of the use of the crosslinkable dispersion powders in applications where aqueous systems are traditionally employed, for example in the binding of non-woven material, lies in a significant reduction in drying expenditure and in the amounts of waste water. In applications where prepolymers or oligomers which can be polymerized completely (for example phenolic resins) are traditionally employed, which are, for example, the binding of glass fibres and production of mouldings from fibre materials, the advantage lies in a significant reduction in the reaction temperatures and in a simplification of the composition of the reaction mixture.

The following examples serve to further illustrate the invention:

EXAMPLE 1

(non-woven compaction):

Non-wovens of a polyester fibre (6.7 dtex/60 mm) with a weight per unit area of about 50 g/m$^2$ were produced in a laboratory carder. Directly at the carder exit, 20% by weight of water, based on the total weight of fibre and binder, and then a dispersion powder based on a vinyl acetate polymer with 1% by weight of N-methylolacrylamide in the amounts stated below were sprinkled in. The non-wovens were compacted at the temperatures stated below. The mechanical properties (breaking force and elongation) in the dry and wet (after storage in water for 1 minute) state were determined in accordance with DIN 53857.

Non-woven 1: application of 26.2% by weight, drier temperature 100° C.

Non-woven 2: application of 28.4% by weight, drier temperature 150° C.

Non-woven 3: application of 27.6% by weight, drier temperature 180° C.

TABLE 1

| Non-woven | | Breaking force BF [N] | Elongation [%] | Relative BF [%] |
|---|---|---|---|---|
| 1 | dry | 4.8 | 46 | |
| | wet | 0.4 | 37 | 8.3 |
| 2 | dry | 4.4 | 54 | |
| | wet | 0.9 | 41 | 20.5 |
| 3 | dry | 5.8 | 42 | |
| | wet | 2.2 | 33 | 37.9 |

*Relative BF = $BF_{wet} \times 100/BF_{dry}$

EXAMPLE 2

(fibre shaped article production):

For production of sheets, 80 g of reclaimed cotton were mixed with 20 g of dispersion powder of the composition stated below and the mixture was laid out over an area of 20×20 cm². Some of the mixtures were also moistened with water by spray application. The mixtures were then pressed under 50 bar for 5 minutes at temperatures of between 180° and 200° C., so that sheets 2 mm thick and weighing 200 g/m² were formed. The breaking force in the dry and wet (after storage in water for 10 minutes) state was determined in accordance with DIN 53857. To evaluate swelling, the sheets were stored in water at room temperature for 24 hours.

Sheet 1: pressed without moisture, dispersion powder based on a vinyl acetate homopolymer Sheet 2: pressed with 20 g of water, dispersion powder based on a vinyl acetate homopolymer Sheet 3: pressed without moisture, dispersion powder based on a vinyl acetate polymer with 1% by weight of N-methylolacrylamide Sheet 4: pressed with 20 g of water, dispersion powder based on a vinyl acetate polymer with 1% by weight of N-methylolacrylamide

TABLE 2

| Sheet | | Breaking force BF [N] | Relative BF [%] | Swelling |
|---|---|---|---|---|
| 1 | dry | 297 | | |
| | wet | 16 | 5.4 | severe |
| 2 | dry | 570 | | |
| | wet | 163 | 28.6 | slight |
| 3 | dry | 822 | | |
| | wet | 394 | 47.9 | severe |
| 4 | dry | 2251 | | |
| | wet | 1279 | 56.8 | none |

What is claimed is:

1. A process for binding fiber materials which comprises
   (a) contacting said materials with from 5 to 50% by weight based on the weight of the fiber material, of a binder based on a vinyl ester copolymer dry powder or a (meth)acrylic acid ester copolymer powder, said vinyl ester copolymer comprising at least one monomer selected from the group consisting of vinyl esters of unbranched or branched alkyl carboxylic acids having 1 to 15 C atoms and the (meth)acrylic acid ester copolymer comprising at least one monomer selected from the group consisting of methacrylic acid esters of alcohols having 1 to 10 carbon atoms and the vinyl ester and (meth)acrylic acid ester copolymer, in each case comprising 0.1 to 10% by weight, based on the total weight of the copolymer of at least one ethylenically unsaturated comonomer having a crosslinking action;
   (b) moistening the material with 5 to 60% by weight of water based on the total weight of dry mixture of fiber and binder before or after the binder has been contacted with the fiber material, and
   (c) heating at 100° to 200° C. under a pressure of up to 100 bar to bind the fibers.

2. The process of claim 1 wherein the fibre material is sprinkled on the material in the form of a crosslinkable redispersible dispersion powder.

3. The process according to claim 2, wherein, after the dispersion powder has been sprinkled onto the moist fibre, the water is removed by heating the fibre structure in a stream of air at a temperature of 80° to 110° C. and before the crosslinking, water is sprayed on the fibre.

4. The process of claim 1 wherein the fibre material is in the form of a sheet or shaped article and the binder is sprinkled on the material in the form of a crosslinkable redispersible dispersion powder.

5. The process of claim 1 wherein the fibre material is a mechanically compacted fibre material and the binder is sprinkled on the material in the form of a crosslinkable redispersible dispersion powder.

6. The process of claim 1 wherein the fibre material is glass fibres, wadding, a non-woven material or needle felt.

* * * * *